C. ALLEN.
THICKENER AND MEANS FOR REMOVING SETTLED SOLIDS THEREFROM.
APPLICATION FILED JULY 22, 1919.

1,355,071.

Patented Oct. 5, 1920.
2 SHEETS—SHEET 1.

INVENTOR
Charles Allen
BY
Strong & Townsend
ATTORNEYS

C. ALLEN.
THICKENER AND MEANS FOR REMOVING SETTLED SOLIDS THEREFROM.
APPLICATION FILED JULY 22, 1919.

1,355,071.

Patented Oct. 5, 1920.
2 SHEETS—SHEET 2.

INVENTOR
Charles Allen
BY
Strong & Townsend
ATTORNEYS

UNITED STATES PATENT OFFICE.

CHARLES ALLEN, OF EL PASO, TEXAS.

THICKENER AND MEANS FOR REMOVING SETTLED SOLIDS THEREFROM.

1,355,071.   Specification of Letters Patent.   Patented Oct. 5, 1920.

Application filed July 22, 1919. Serial No. 312,601.

*To all whom it may concern:*

Be it known that I, CHARLES ALLEN, a citizen of the United States, residing at El Paso, in the county of El Paso and State of Texas, have invented new and useful Improvements in Thickeners and Means for Removing Settled Solids Therefrom, of which the following is a specification.

This invention relates to thickeners for solids in suspension in a liquid, and pertains especially to means for automatically and continuously removing the thickened material therefrom. The thickening, so called, is a partial dewatering of finely divided solids in suspension and comprises a step in the treatment of ores by wet milling processes.

In my copending application, Ser. No. 232,422, I have shown and described a thickener comprising a tank having a controllable orifice in its bottom for the discharge of settled material, said tank having a rim overflow and an inlet for the material to be treated so disposed as to avoid agitation, together with an actuating member controlling the discharge orifice, which is sensitive only to variations in density of the contents of the tank.

It has been found in practice that frequently mill conditions make it difficult or impossible to secure the necessary height for installation where the discharge is at the bottom of the tank. For instance in the spigot discharge cone or tank shown in said application Ser. No. 232,422 there must be available the full vertical height of the device from inlet to spigot; whereas in many mills the necessary height is not obtainable.

The present device has been particularly designed to permit feed and discharge to be on the same level or for that matter the constant density discharge may be above or below the level of the feed stream, as may best fit the conditions of the particular installation.

The present invention is particularly advantageous where it is desired to sink the cones into the ground, which is quite an advantage when the cone is built of cement.

Having reference to the accompanying drawings—

Figure 1:
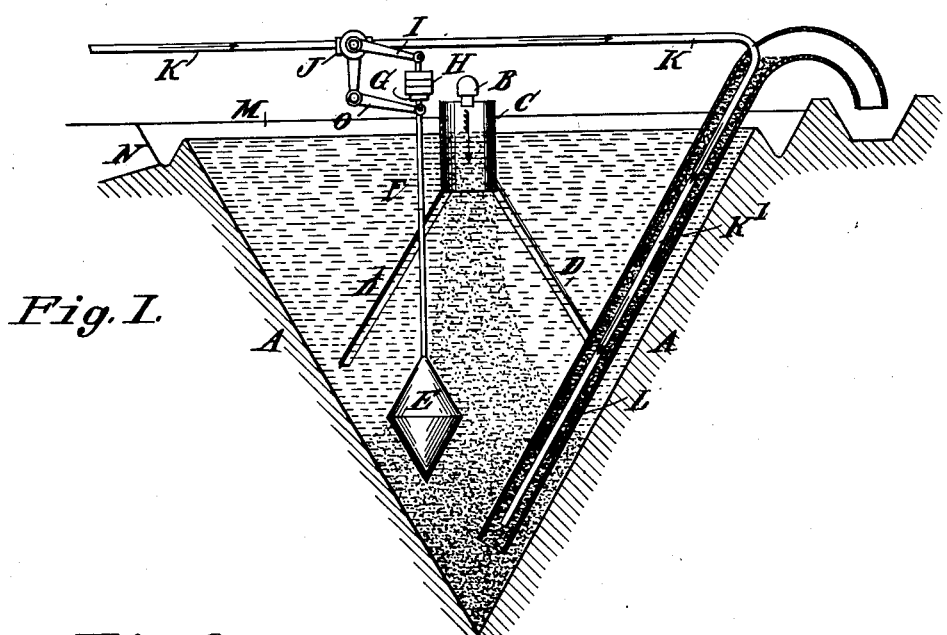
Figure 1 is a sectional schematic view of one form of the invention.
Figure 2:
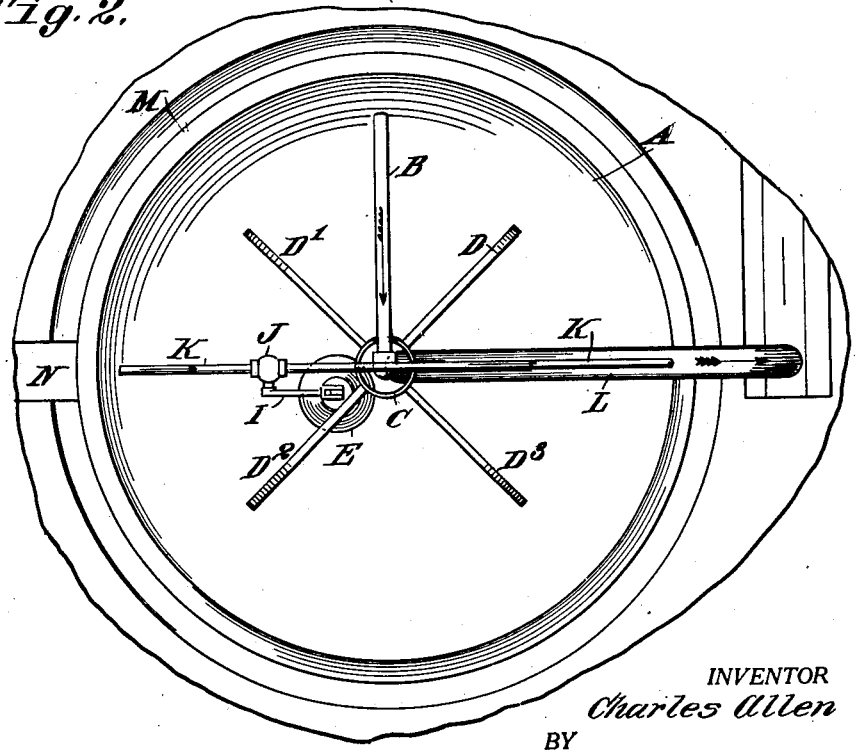
Fig. 2 is a plan view thereof.

A represents a tank or receptacle of any suitable size, shape or material, preferably in the form of a cone; hence the name "settling and thickening cones."

B represents a pipe conducting the feed stream to the cone.

C is a submerged inlet spout to prevent surface agitation.

D, $D^1$, $D^2$ and $D^3$ are the supports for the spout C.

E is the actuating member or float, so-called, submerged in the tank and disposed near the bottom thereof in the zone of the settling solids.

F is the rod or stem connecting the actuating member E with the valve arm I.

G is a disk that supports the weights H.

H represents the weights used to limit the lifting force of the actuating member E.

I is a valve arm lever connecting the stem F with the valve J.

J is a valve in the air supply pipe K.

K and $K^1$ represent the air supply pipe of the air lift L.

L represents the column of the air lift.

M is the overflow launder of the tank A.

N is the spout of the overflow launder.

O is the guide for the purpose of holding rod F in a vertical position.

Although I have designated the member E a "float," it is to be understood that with water only in the tank this member will not possess any buoyancy, being heavier than the liquid within which it is suspended. The properties of buoyancy would be assumed by the float when the density of the solids within the liquid is great enough to overcome the weight of the member E; this force being exactly determined by proper adjustment of the weights H; in other words, the member E is a float only under certain conditions.

In operation, the pulp stream is conducted through the pipe B to the inlet spout C. The pulp stream passes through the spout C and enters the tank or cone A, in which it is separated into two products. A portion of the water, either clear water or water carrying with it the lighter solid particles overflow the cone into the launder M. The solid particles not carried into the overflow launder settle toward the bottom of the cone and are discharged from it by means of the lift $K^1$ and L.

As described above, the device is simply a sand settling or thickening tank fitted with an air lift to carry out the settling, settled or thickened material. In settling and thickening operations it is desirable that the thickened material discharged as a separate product be always of the same density regardless of fluctuations in the volume or the density of the feed stream entering the tank. This result could not be obtained by using the combination of a tank and air lift as above described, because the air lift would discharge a uniform volume of the contents of the tank regardless of the volume of the feed stream entering the tank or its density. If the feed into the tank were clear water the air lift would be discharging clear water. Should the volume of the feed stream entering the tank be less than the volume being discharged by the air lift the air lift would lower the contents of the tank to a considerable distance below the overflow lip of the tank, under which condition a separation of the feed stream into two products is impossible. It is evident that when a constant density discharge is required such a combination would be worthless.

To change the variable density air lift discharge into a constant density discharge, the device is fitted with the immersed actuating member E; the stem F, connecting the actuating member E with the arm I of the valve J in the air pipe K. The weights H on the rod F determine the lifting force exerted by the actuating member E. The buoyance of the actuating member E varies with every change in the density of the fluid mass by which it is surrounded. Hence the weights H can be adjusted so that the actuating member E is not available as an actuating member until the fluid mass in which it is immersed attains a predetermined density; and until the predetermined density is attained the downward pull of the member E keeps closed the valve J in the air pipe K. As soon as the density of the medium surrounding the member E reaches the point at which member E becomes buoyant, it rises and through the connections F and I opens the valve J in the air pipe K in proportion to its rise.

Fig. 1 illustrates an air lift device and to secure the highest efficiency in an air lift the air must issue from the air pipe K¹ under pressure but slightly greater than is sufficient to counterbalance the pressure of the fluid in the receptacle A. There is no jet effect to its issuance. As long as the issuing air does not escape from the lower end of the pipe L its lifting force is effective. The discharge through L is due to the difference in the weight of the two columns above the bottom outlet of L. The weight of the fluid outside of L is greater than the weight of the fluid mixed with air inside of L and the difference is the velocity head to the flow through L. The velocity of the flow through L is increased by the expansion of the air in L from its bottom to its top where the air discharges with the fluid carried with it at little above atmospheric pressure.

The opening of the valve J, by permitting the passage of compressed air, starts the air lift to discharging material from the tank A and it will continue to so discharge as long as the member E is buoyant, but when the density of the surrounding medium falls to where E loses its available lifting force, member E sinks and by its descent closes the air valve J and discharge through the air lift ceases. Hence what was without the parts E—F—G—H—I and J a constant volume of discharge from the air lift is changed into an air lift discharge of constant density.

Figure 3:
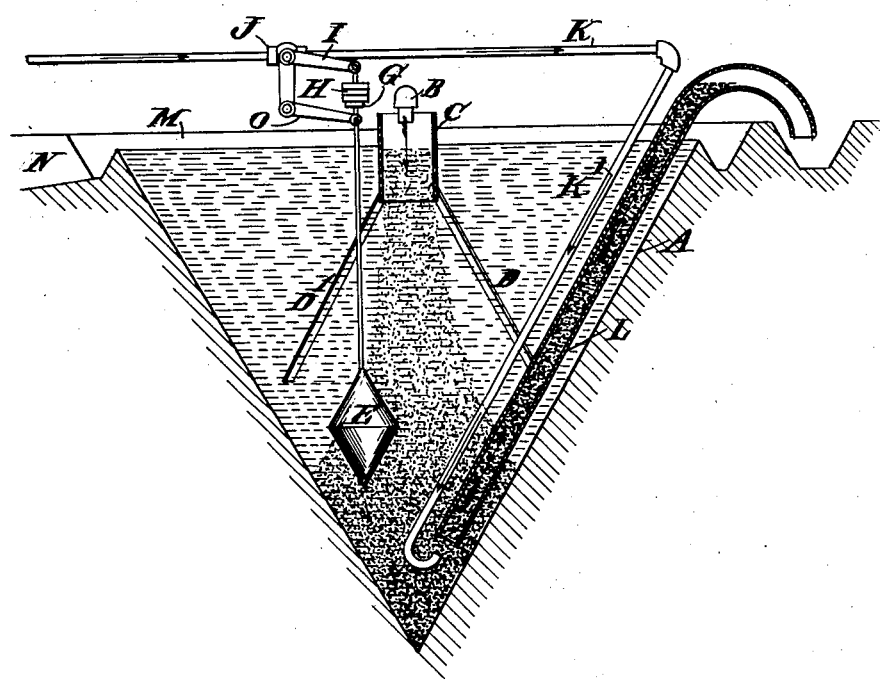
Fig. 3 illustrates a modification.

Fig. 3 shows the air lift replaced by a jet ejector; the only change from Fig. 1 being that the air pipe for the air lift is now the water supply pipe for the jet and that it is outside of the column R.

The jet water will lower the density of the material sucked up by the jet, but the combined discharge of jet water and material drawn by it from the tank will be practically constant. The actuating member E can be so weighted that the combined discharge will be of the required density. In many mills compressed air is not available, water under pressure can nearly always be obtained.

It is understood, of course, that any sort of fluid ejector may be employed to effect the required functions. The reason for a rim discharge over a spigot discharge of my prior application has already been pointed out.

It is manifest that while I have shown the cones in the present case as made of concrete and flush with the ground level, they may be made portable and set up anywhere, either flush with, or above the ground or floor level. Also the lift may discharge at any desired point above the tank rim.

Having thus described my invention, what I claim and desire to secure by Letters Patent is—

1. In a pulp thickener, the combination of a tank having an actuating member movable by variations in density, and discharge means within and adjacent to the tank bottom for the settled solids controlled by the actuating member, said discharge means discharging from within the tank and over the rim of the tank.

2. In a pulp thickener, the combination of a tank having an actuating member movable by variations in density, discharge means within and adjacent to the tank bottom for the settled solids, said discharge means discharging from within the tank and over the rim of the tank, and means for operating said discharge means in unison with the movements of the actuating member.

3. In a thickener, the combination of a tank closed at the bottom and having an actuating member movable therein by variations in density and submerged in the tank, and discharge means for the solids disposed within the tank and discharging over the rim of the tank and operable in unison with the variations in level of the actuating member.

4. In a pulp thickener, the combination of a tank having an actuating member movable by variations in density, discharge means within and adjacent to the tank bottom for the settled solids, said discharge means discharging from within the tank and over the rim of the tank, and means by which the density of the discharged material may be varied.

5. In a thickener, the combination of a tank closed at the bottom and having an actuating member movable therein by variations in density and submerged in the tank, discharge means for the solids disposed within the tank and discharging over the rim of the tank and operable in unison with the variations in level of the actuating member, and means by which the density of the discharged material may be varied.

6. In a pulp thickener, the combination of a tank having an actuating member movable by variations in density, and discharge means within and adjacent to the tank bottom for the settled solids, said discharge means discharging from within the tank and over the rim of the tank, said discharge means including a fluid ejector.

7. In a thickener, the combination of a tank closed at the bottom and having an actuating member movable therein by variations in density and submerged in the tank, and discharge means for the solids disposed within the tank and discharging over the rim of the tank and operable in unison with the variations in level of the actuating member, said discharge means including a fluid ejector.

8. In a thickener, the combination of a cone closed at the bottom and having a rim overflow, an inlet for the material to be treated disposed to avoid agitation, an actuating member submerged in the tank and sensitive only to variations in density of the contents of the tank, and a fluid ejector for the settling solids around the actuating member with means controlled by said actuating member for operating the fluid ejector only when the said actuating means indicates the proper degree of density of the settled materials, whereby there is effected a discharge of settled materials of constant density.

9. In a settler, the combination of a tank closed at the bottom, an actuating member therein movable by variations in density and submerged in the tank, fluid pressure discharge means for the material settling around the actuating member, and means actuated by the movement of the latter for controlling the operation of the fluid pressure means whereby the material discharged is of constant density.

10. In a thickener, the combination of a tank closed at the bottom and having an actuating member movable therein by variations in density and submerged in the tank, and discharge means for the solids disposed within the tank and discharging over the rim of the tank and operable in unison with the variations in level of the actuating member, said discharge means including a fluid conduit terminating in an ejector for lifting the thickened material to be discharged with a valve in said fluid conduit controlled by the actuating member.

11. In a thickener, the combination of a tank closed at the bottom and having an actuating member movable therein by variations in density and submerged in the tank, and discharge means for the solids disposed within the tank and discharging over the rim of the tank and operable in unison with the variations in level of the actuating member, said discharge means including a fluid conduit terminating in an ejector for lifting the thickened material to be discharged with a valve in said fluid conduit controlled by the actuating member, the connections of the valve and actuating member serving as a guide to direct the movements of the actuating member.

In testimony whereof I have hereunto set my hand in the presence of two subscribing witnesses.

CHARLES ALLEN.

Witnesses:
  ARTHUR H. SWETT,
  J. L. ELY.